United States Patent
Taylor

(10) Patent No.: US 6,659,119 B2
(45) Date of Patent: Dec. 9, 2003

(54) FLUID PRESSURE RESPONSIVE DUAL PISTON OR EMERGENCY SHUTDOWN VALVE ACTUATOR

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 57 days.

(21) Appl. No.: 10/020,611

(22) Filed: Dec. 18, 2001

(65) Prior Publication Data

US 2003/0111110 A1 Jun. 19, 2003

(51) Int. Cl.⁷ .............................................. F16K 17/40
(52) U.S. Cl. ...................................................... 137/70
(58) Field of Search ........................ 137/70, 71, 467, 137/494, 511, 557; 251/58

(56) References Cited

U.S. PATENT DOCUMENTS

| | | | |
|---|---|---|---|
| 310,031 A | * 12/1884 | Castelnau | 137/494 |
| 3,107,080 A | * 10/1963 | Priese | 251/58 |
| 3,542,052 A | 11/1970 | Irwin | |
| 4,724,857 A | 2/1988 | Taylor | |
| 4,949,936 A | * 8/1990 | Messina | 251/58 |
| 5,067,511 A | 11/1991 | Taylor | |
| 5,086,801 A | * 2/1992 | Peacock et al. | 137/494 |
| 5,146,942 A | 9/1992 | Taylor | |
| 5,297,575 A | 3/1994 | Taylor | |
| 5,318,060 A | 6/1994 | Taylor | |
| 5,325,888 A | * 7/1994 | Stary | 251/58 |
| 5,433,239 A | 7/1995 | Taylor | |
| 5,462,086 A | 10/1995 | Taylor et al. | |
| 5,575,306 A | 11/1996 | Taylor | |
| 5,685,329 A | 11/1997 | Taylor | |
| 6,155,284 A | 12/2000 | Scantlin | |
| 6,325,088 B1 | 12/2001 | Scantlin | |
| 6,425,410 B1 | 7/2002 | Taylor | |

FOREIGN PATENT DOCUMENTS

| | | |
|---|---|---|
| JP | 2196096 A | 4/1988 |
| JP | 2247300 A | 2/1992 |

* cited by examiner

Primary Examiner—John Rivell
(74) Attorney, Agent, or Firm—Fellers, Snider, et al.

(57) ABSTRACT

This valve actuator is formed by a pair of pistons in a sleeve valve body fluid pressure or vacuum moved away from each other for angularly rotating a shaft, transversely journaled by the body, in a predetermined direction and opening or closing a fluid control valve to protect a fluid system.

13 Claims, 2 Drawing Sheets

FLUID PRESSURE RESPONSIVE DUAL PISTON OR EMERGENCY SHUTDOWN VALVE ACTUATOR

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to fluid pressure responsive collapsible pin type relief valves and more particularly to a dual piston valve actuator.

2. Description of the Prior Art

Collapsible buckling pin type valves are known in the art; however, I am not aware of a collapsible pin-type actuator body containing dual pistons acting on a pinion in response to system fluid pressure for opening or closing a system valve.

BRIEF SUMMARY OF THE INVENTION

The valve actuator includes a sleeve-like body having flanged ends closed by bolt flanges and having a pair of pistons slidably disposed in respective end portions of the body. The body transversely journals a shaft having a pinion thereon meshing with racks on piston arms projecting toward the opposite piston and in mesh with the pinion. The respective end of the body wall contains an inlet port communicating with respective ends of the valve actuator body and a third inlet port communicating with body between the position of the pistons. A piston rod is slidable through the bonnet of the valve actuator and supports one end of a collapsible pin supported at its other end by a plate supported by a plurality of post means secured to the valve actuator bonnet. Fluid pressure of a predetermined value entering the space between the pistons, collapses the pin at a desired set point to activate the valve and open or close a system valve.

A principal object of this invention is to provide a collapsible pin dual piston-type valve actuator responsive to excessive system fluid pressure or vacuum which separates a pair of pistons and buckles the collapsible pin while simultaneously angularly rotating a control shaft opening or closing a system valve.

DETAILED DESCRIPTION OF THE INVENTION

Figure 1:
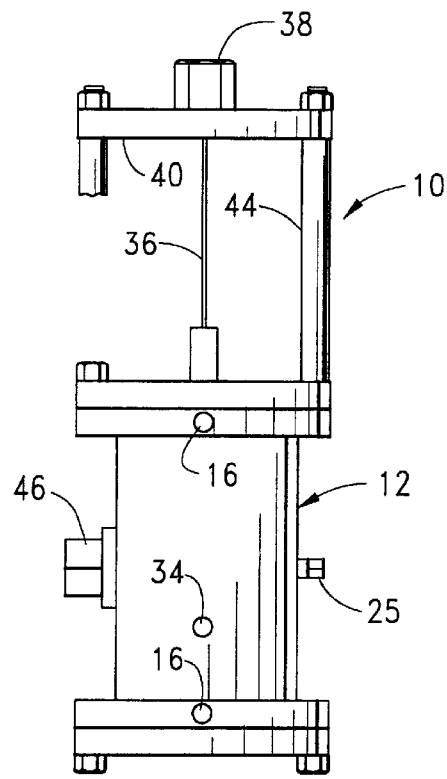
FIG. 1 is an elevational view.
Figure 1:
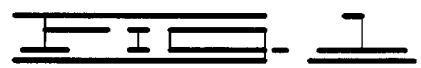
Figure 2:
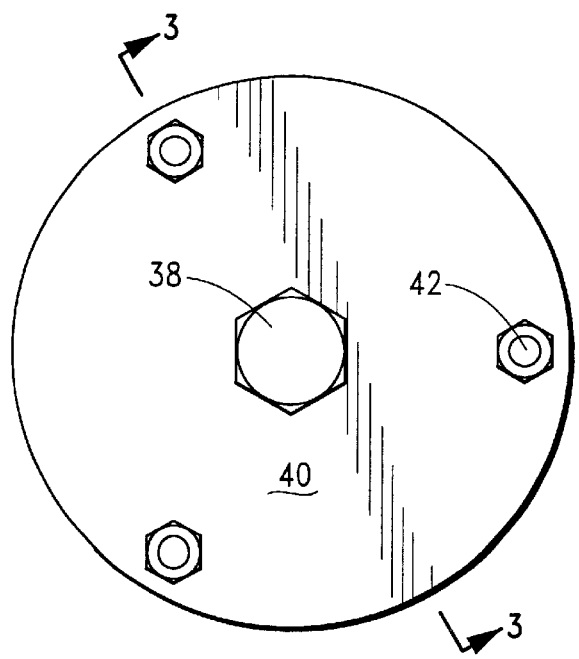
FIG. 2 is a top view to a larger scale.
Figure 2:
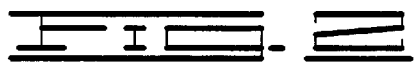

The reference numeral 10 indicates the valve comprising a sleeve-like body 12 having flanged ends closed by a bolt flange 14 and a bonnet 15. Body wall ports 16 communicate with both end portions of the sleeve 12. A pair of pistons 20 and 22 are slidably disposed in respective end portions of the sleeve. The piston 20 includes a piston rod 29 having a keyway or wrench flats 46 at the end portion opposite the valve driving end 25, slidably supported by the valve bonnet 15. A shaft 24 is transversely journaled by the body and supports a pinion 26 meshing with racks 28 on confronting surfaces of a pair of piston eccentric arms 30 and 32 projecting toward the respective opposite piston in laterally spaced confronting relation.

An axial piston rod 29 on the piston 20 is slidably received by the bonnet 15 and supports one end of a collapsible buckling pin 36 supported at its other end by a nut 38 in a plate 40 supported in parallel spaced relation with respect to the valve bonnet 15 by a plurality of posts 42 respectively surrounded by spacers 44.

Operation

Figure 3:
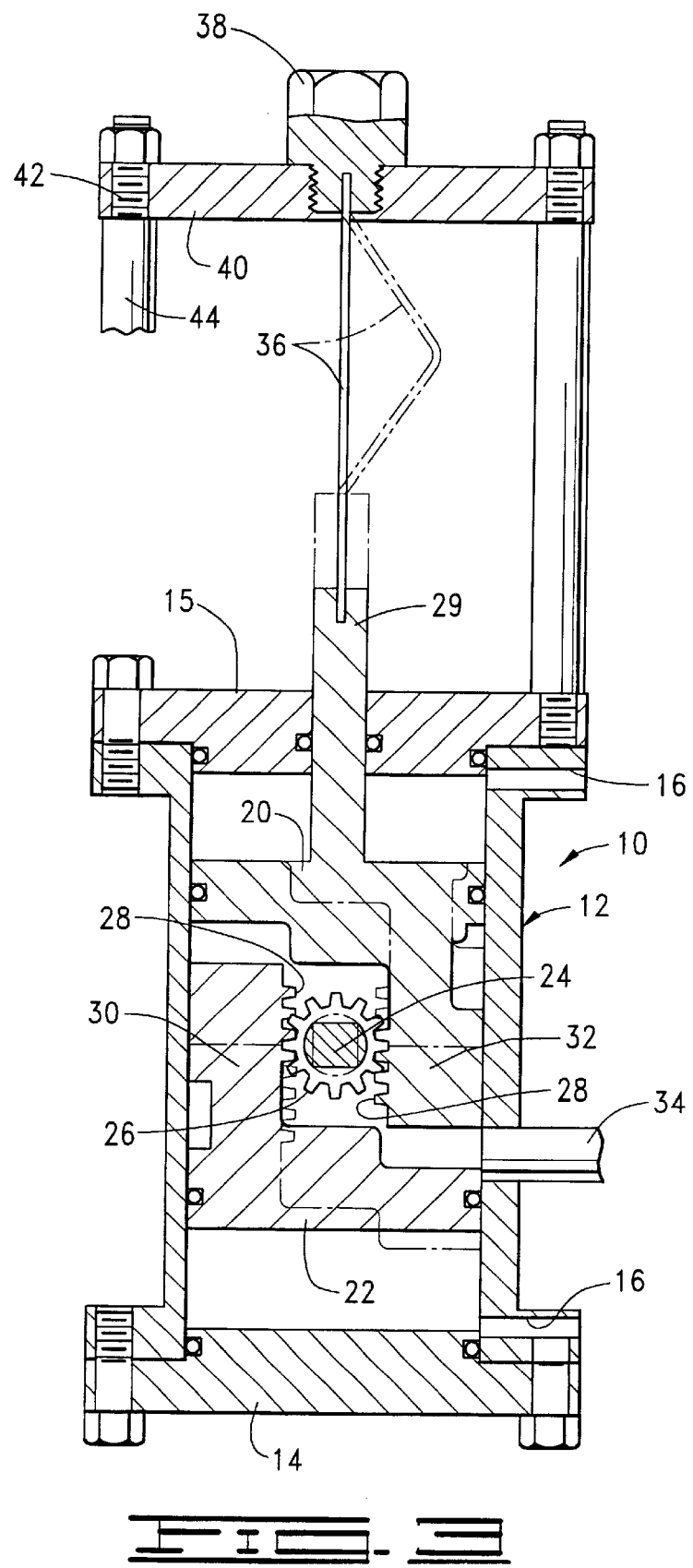
FIG. 3 is fragmentary vertical cross section view taken substantially along the line 3—3 of FIG. 2.

Assuming the valve 10 as shown by solid lines (FIG. 3) has its inlet port 34 connected with fluid under pressure to be monitored and ports 16 vented to atmosphere. Excess fluid pressure in the space between the pistons 20 and 22 puts an axial force on pin 36 that will buckle at a desired set point and allow the pistons to move away from each other angularly rotating the pinion 26 and its shaft 24 for opening or closing a system control valve, not shown.

Also assuming the valve 10 has inlet ports 16 connected with system vacuum and port 34 vented to atmosphere. Excess vacuum on the ends of pistons 20 and 22 puts an axial force on pin 36 that will buckle at a desired vacuum set point and allow the pistons to move away from each other angularly rotating pinion 26 and its shaft 24 for opening or closing a system control valve.

The axial force from the pistons buckles the collapsible pin 36 and allows the system pressure to move the pistons to the full stroke position rotating the valve to protect the system. After correcting the problem the actuator and valve may be reset by applying pressure to both ends of the valve body 12 through the ports 16 to position the pistons 20 and 22 substantially in the position shown (FIG. 3) wherein a new pin 36, not shown, may be installed by removing the threaded plug 38, discarding the old pin and inserting a new one, reseating pressure is then removed. The actuator and valve may be reset mechanically by angularly rotating shaft end 46.

Obviously the invention is susceptible to changes or alterations without defeating its practicability. Therefore, I do not wish to be confined to the preferred embodiment(s) shown in the drawing(s) and described herein.

I claim:

1. A fluid pressure monitoring relief valve actuator, comprising:

a sleeve-like body closed at both ends and having wall ports respectively communicating with both ends and an intermediate portion of said body;

opposing pistons in said body for sliding movement toward and away from each other;

first means interposed between said pistons for facilitating movement of said pistons away from each other in response to fluid pressure or vacuum of predetermined value applied to adjacent or opposite ends, respectively, of the pistons; and a collapsible member coupled to a selected one of the pistons, wherein the collapsible member initially takes an uncollapsed, rigid state to oppose said movement of the pistons, and wherein the collapsible member subsequently buckles when said predetermined value is reached, thereby allowing the first means to facilitate said movement of the pistons.

2. The relief valve actuator according to claim 1 wherein the first means comprises:

an axial arm on each said piston projecting toward the other piston in spaced overlapping confronting relation with respect to the other arm;

a rack on the confronting surface of each said piston arm; and, a pinion journaled by said body and meshing with said racks.

3. The relief valve actuator according to claim 2 wherein the pinion is coupled to a shaft so that, upon said movement of the pistons away from each other, the shaft is rotated to affect a flow state of an associated system valve.

4. The relief valve actuator according to claim 1 wherein the collapsible member comprises an elongated buckling pin.

5. The relief valve actuator according to claim 4 wherein the pin has a proximal end captured by the end of the selected one of the pistons and a distal end captured by a plate coupled to the sleeve-like body.

6. The relief valve actuator according to claim 5 wherein the end of the selected one of the pistons supporting the proximal end of the pin extends through an aperture in the sleeve-like body.

7. A fluid pressure monitoring relief valve actuator, comprising:

a piston arranged for lateral movement within a housing in response to application of fluid pressure or vacuum to the piston;

a rotatable shaft coupled to the piston which rotates in response to the lateral movement of the piston; and a collapsible member supported by the piston, wherein the collapsible member initially takes an uncollapsed, rigid state to oppose the lateral movement of the piston, and wherein the collapsible member subsequently buckles when a predetermined value of the fluid pressure or vacuum is reached, thereby allowing the fluid pressure or vacuum to advance the piston within the housing and induce rotation in the shaft.

8. The relief valve actuator according to claim 7 wherein the piston includes an axial arm which supports a rack, and wherein the shaft supports a pinion which meshes with the rack.

9. The relief valve actuator according to claim 7 wherein the rotation of the shaft affects a flow state of an associated system valve.

10. The relief valve actuator according to claim 7 wherein the collapsible member comprises an elongated buckling pin.

11. The relief valve actuator according to claim 10 wherein the pin has a proximal end captured by the piston and a distal end captured by a plate coupled to the housing.

12. The relief valve actuator according to claim 7 wherein the piston is characterized as a first piston and wherein the relief valve actuator further comprises a second piston coupled to the shaft and further arranged within the housing for sliding movement away from the first piston in response to the application of the fluidic pressure or vacuum.

13. The relief valve actuator according to claim 7 wherein a first end of the piston is coupled to the shaft and wherein an opposing, second end of the piston captures the collapsible member.

* * * * *